(No Model.)

S. BERGMANN.
CARRIER FOR PNEUMATIC TRANSMISSION.

No. 340,477. Patented Apr. 20, 1886.

ATTEST:

INVENTOR:

UNITED STATES PATENT OFFICE.

SIGMUND BERGMANN, OF NEW YORK, N. Y., ASSIGNOR TO BERGMANN & CO.

CARRIER FOR PNEUMATIC TRANSMISSION.

SPECIFICATION forming part of Letters Patent No. 340,477, dated April 20, 1886.

Application filed February 20, 1886. Serial No. 192,636. (No model.)

*To all whom it may concern:*

Be it known that I, SIGMUND BERGMANN, of the city of New York, in the county and State of New York, have invented a certain new and useful Improvement in Carriers for Pneumatic Transmission, of which the following is a specification.

Figure 1:
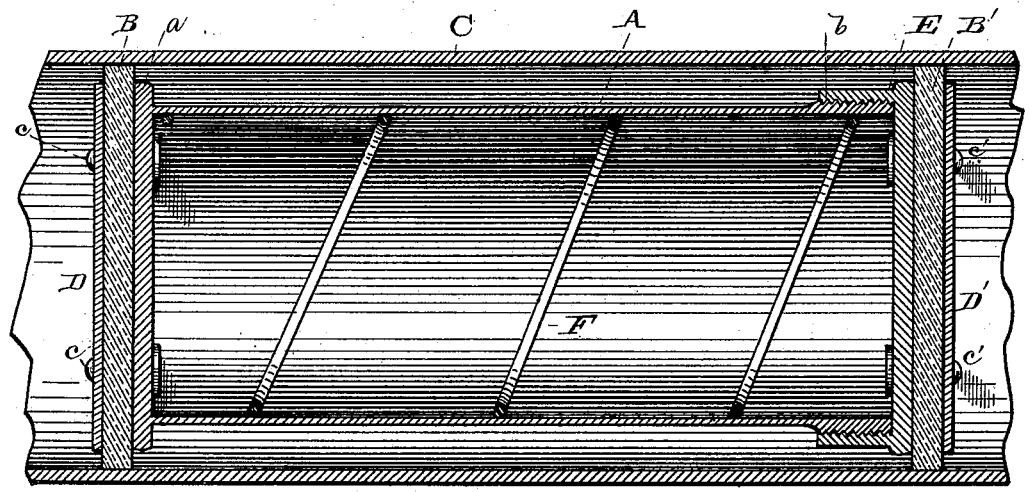
Figure 2:
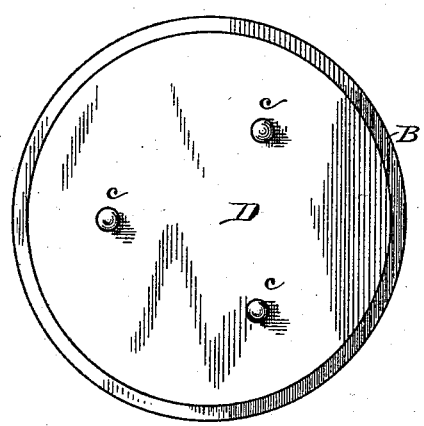

My invention relates to the boxes or carriers which are propelled through pneumatic tubes, and contain the paper or other article to be transmitted; and my object is to produce a carrier which shall be cheaper in construction and stronger and more durable and more efficient in use than those heretofore employed.
My invention is illustrated in the annexed drawings, in which Figure 1 is a longitudinal section of a carrier embodying said invention in a tube, and Fig. 2 an end view of the carrier.
A is a cylinder, closed permanently at one end, of flexible rubber—that is to say, it may be of soft rubber, which I prefer, or of rubber cloth. At the closed end of the cylinder is a flange, *a*, and at the other an external screw-thread, *b*. When the cylinder is of soft rubber, it is preferably molded with the flange and screw-thread upon it. When it is of rubber cloth, the flange is secured to it and the screw-thread formed upon it in any suitable manner.

Upon the flanged end *a* is placed a larger disk, B, of felt, of such size as to fit closely the pneumatic tube C, through which the carrier is propelled. Upon the outside of said disk B is a rubber washer, D, and rivets *c* pass through the washer, the disk, and the end of the cylinder, thus securing these parts together.

The other end of the cylinder is provided with a flanged screw-threaded cap, E, to which are secured by rivets *c'* the felt disk B' and the rubber washer D'. Thus the two ends of the carrier are alike when the cap or cover is upon it. Said cap or cover is removed to place an article within the carrier, and then replaced before the carrier is placed in the tube for transmission.

F is a metal spring placed within the cylinder, if desired, to hold the same in shape. The spring may, however, be dispensed with.

Heretofore it has been usual to make these carriers or boxes of felt. This is likely to break, and is not durable in use. The rubber which I use being flexible, there is no such danger. In the old form metal caps and flanges have been employed at the ends of the carrier; but I provide a much more simple construction by having simply the flexible rubber body with larger felt disks at its ends. My carrier also is impervious to moisture, and is lighter than the old carriers.

As stated, the disks B B' fit closely the tube C, and slide along the tube when the carrier is in motion.

What I claim is—

1. In a pneumatic carrier, the combination of a flexible rubber cylinder closed at one end and a rubber cap for closing the other end, substantially as set forth.

2. The cylinder for a pneumatic carrier, molded of soft rubber, with one end open and the other closed, and a screw-thread at the open end, in combination with the rubber cap for closing the same, substantially as set forth.

3. In a pneumatic carrier, the combination of the cylinder of flexible rubber having a flange at one end, the flanged rubber cap closing the other end, and the felt disks secured one to said flanged end, the other to said cap, substantially as set forth.

This specification signed and witnessed this 17th day of February, 1886.

SIGMUND BERGMANN.

Witnesses:
P. H. KLEIN, Jr.,
JOHN F. RANDOLPH.